(12) United States Patent  (10) Patent No.: US 7,541,553 B2
Meyer et al. (45) Date of Patent: Jun. 2, 2009

(54) ACTUATING DEVICE WITH PUSH BUTTONS

(75) Inventors: Joerg Meyer, Wagenfeld (DE); Andreas Giefer, Lemfoerde (DE)

(73) Assignee: ZF Friedrichshafen AG, Lemförde (DE)

( * ) Notice: Subject to any disclaimer, the term of this patent is extended or adjusted under 35 U.S.C. 154(b) by 0 days.

(21) Appl. No.: 11/719,030

(22) PCT Filed: Nov. 8, 2005

(86) PCT No.: PCT/DE2005/002009

§ 371 (c)(1),
(2), (4) Date: Oct. 18, 2007

(87) PCT Pub. No.: WO2006/050703

PCT Pub. Date: May 18, 2006

(65) Prior Publication Data

US 2008/0128252 A1 Jun. 5, 2008

(30) Foreign Application Priority Data

Nov. 11, 2004 (DE) ........................ 10 2004 054 617

(51) Int. Cl.
*H01H 9/00* (2006.01)
(52) U.S. Cl. ........................ 200/318; 200/310
(58) Field of Classification Search ......... 200/310–314, 200/345–341, 318; 74/72, 473.21–473.31; 335/205–207
See application file for complete search history.

(56) References Cited

U.S. PATENT DOCUMENTS

| | | | |
|---|---|---|---|
| 3,448,417 A | 6/1969 | Schiller et al. | |
| 3,768,061 A | 10/1973 | Peil et al. | |
| 4,790,204 A * | 12/1988 | Tury et al. | 74/483 PB |
| 4,817,471 A * | 4/1989 | Tury | 477/125 |
| 4,841,793 A * | 6/1989 | Leigh-Monstevens et al. | 74/335 |
| 4,843,901 A * | 7/1989 | Peterson et al. | 74/335 |
| 4,922,769 A * | 5/1990 | Tury | 477/125 |
| 4,981,202 A * | 1/1991 | Leigh-Monstevens et al. | 477/78 |
| 4,998,444 A * | 3/1991 | Mabee | 74/335 |
| 5,021,764 A * | 6/1991 | Mabee | 340/439 |

(Continued)

FOREIGN PATENT DOCUMENTS

DE 30 25 174 A1 1/1982

(Continued)

*Primary Examiner*—Michael A Friedhofer
*Assistant Examiner*—Lisa N Klaus
(74) *Attorney, Agent, or Firm*—McGlew and Tuttle, P.C.

(57) ABSTRACT

An actuating device is provided for a technical system, especially for selecting gears of a shift-by-wire speed-change gear. This includes a push button arrangement with at least one push button (1) as well as a device (4) generating electrical control signals for transmission to the technical system. The actuating device has a separately controllable blocking device (2, 3), each associated with at least one push button or all push buttons of the actuating device. The blocking device (2, 3) mechanically blocks the particular push button (1) and can be driven by auxiliary energy. This provides an unambiguous tactile feedback on the state of the system or the admissibility of the shifting operation when the push buttons are pressed. Hazards that arise from unrecognized states of the system, inadmissible shift commands or operating errors, defects on the system or non-functioning signal transmission between the actuating device and the system are eliminated.

20 Claims, 2 Drawing Sheets

U.S. PATENT DOCUMENTS

| | | | |
|---|---|---|---|
| 5,065,135 A * | 11/1991 | Leigh-Monstevens et al. | 340/463 |
| 6,295,887 B1 | 10/2001 | DeJonge et al. | |
| 6,927,671 B2 * | 8/2005 | DeBono | 340/5.83 |
| 7,001,308 B2 * | 2/2006 | Henneken et al. | 477/121 |

FOREIGN PATENT DOCUMENTS

| | | |
|---|---|---|
| DE | 34 30 090 A1 | 3/1986 |
| DE | 101 26 129 A1 | 1/2002 |
| DE | 101 28 805 A1 | 1/2003 |
| DE | 102 60 168 A1 | 7/2004 |
| EP | 0 846 820 A1 | 6/1998 |
| EP | 1 251 297 A2 | 10/2002 |
| EP | 1 251 297 B1 | 10/2002 |
| GB | 1 412 808 | 11/1975 |
| JP | 5-109336 | 4/1993 |

* cited by examiner

ACTUATING DEVICE WITH PUSH BUTTONS

CROSS REFERENCE TO RELATED APPLICATIONS

This application is a United States National Phase application of International Application PCT/DE2005/002009 and claims the benefit of priority under 35 U.S.C. § 119 of German Patent Application DE 10 2004 054 617.7 filed Nov. 11, 2004, the entire contents of which are incorporated herein by reference.

FIELD OF THE INVENTION

The present invention pertains to a device for actuating a technical system with a push button arrangement.

BACKGROUND OF THE INVENTION

Actuating device of this class are used, for example, but by no means exclusively, for manually selecting gears or for gear preselection in speed-change gears of motor vehicles.

The gear is preselected or the operating state of the vehicle transmission is controlled now in an increasing number of motor vehicle models by means of electrical or electronic signal transmission. An electrical or electronic actuation of technical systems or transmissions, which makes do without mechanical connection in this manner, does, however, entail that the operator or the driver has, in general, no feedback whatsoever on the execution of a control command and optionally also no feedback on the fact that his actuating command may not be admissible, contrary to operation by means of the prior-art mechanical actuating device.

It may rather happen in actuating device with push buttons and with electrical or electronic signal transmission that the system or vehicle transmission to be controlled does not assume the operating state associated with the pressed push button for certain reasons after one of the push buttons of the actuating device has been pressed. In other words, this means that the desired state of the controlled system, for example, of the vehicle transmission, which state is selected by pressing the push button, does not agree with the actual shifting state of the system or transmission. Such a divergence between the actual operating state of a technical system and the control command—presumably—entered with the controlling push buttons may have various causes.

In the case of the example of the control or gear preselection on an automatic transmission of a vehicle, motor vehicles equipped with automatic transmission are frequently provided with a so-called shiftlock function. Especially the shift positions "D" and "R" can be selected from the neutral position "N" in a vehicle with shiftlock function only when the brake pedal is pressed at the same time. This is used for safety and shall prevent a gear from being engaged with the engine running, for example, by inadvertently striking the gear selector lever of the transmission and the vehicle from coming into motion in an uncontrolled manner.

However, in case of an electrical or electronic push button control of a shift-by-wire vehicle transmission, which is provided with a shiftlock function, the driver could select, for example, the shift position "D" by pressing the corresponding push button when the brake pedal is not pressed. However, since the brake pedal is not pressed in the case of the example, the transmission remains in the neutral position "N" without any change because of the shiftlock function, whereas the driver believes after pressing the push button "D" that the corresponding gear is now engaged.

As a result, this situation leads to a potential safety risk, because the vehicle may inadvertently roll backwards on a slope in such a case, or the driver may not leave a hazardous situation quickly enough in the false belief of having engaged the Drive gear.

Furthermore, there also may be, for example, a malfunctioning or non-functioning transmission of the control commands between the actuating device and the system or vehicle transmission controlled therewith, with the consequence that the gear preselected by the driver on the actuating device is not recognized by the system and the corresponding control command is thus not sent to the transmission.

A hazardous situation of this type is given in case of the push button-controlled actuation of a motor vehicle transmission, for example, when the driver brings the vehicle to a stop after driving with the gear "D" engaged and selects the shift position "P" for the parking brake with the engine running. However, the Drive gear "D" continues to be engaged if the signal transmission is not functioning between the actuating device and the vehicle transmission, without the non-functioning signal transmission being communicated to the driver during his attempt at engaging the parking brake. If the driver now leaves the vehicle in the belief that he has engaged the parking brake, the vehicle will set automatically into motion because the gear is actually still being engaged.

SUMMARY OF THE INVENTION

Against this background, the object of the present invention is to provide a means for the push button-controlled electrical or electronic actuation of a technical system, for example, a speed-change gear, with which the drawbacks of the state of the art can be overcome. In particular, the actuating device shall make possible an unambiguous tactile feedback on the state of the system or the shifting operation when the push buttons are pressed. Furthermore, the risk of states of the system that are not recognizable to the operator in case of unacceptable shift commands or incorrect actuations, in case of defects in the system or in case of non-functioning signal transmission between the actuating device and the system shall be eliminated as well.

The actuating device according to the present invention comprises, in a manner primarily known per se, a push button arrangement with at least one push button. Furthermore, the actuating device has means for generating electrical control signals for the transmission of a shift command to the technical system being controlled.

However, the actuating device is characterized according to the present invention in that a separately controllable blocking means is associated with at least one push button, but preferably with all existing push buttons, for mechanically blocking the push button. The blocking means can be driven by means of auxiliary energy.

In other words, this means that the push button used to actuate the technical system or the plurality of push buttons of a push button arrangement for controlling the technical system can be blocked individually by means of a blocking means each.

The problems described in the introduction, which occur in case of the control of technical systems by means of electrical or electronic signals, for example, in electronically controlled automatic transmissions, are eliminated in this manner.

Because of the possibility of blocking the push buttons of the actuating device individually, e.g., shift commands that are not admissible based on the instantaneous state of the system cannot be blocked, as in the state of the art, only by the fact that such inadmissible shift commands are simply ignored by the system. Thanks to the individual blockability of the push buttons, it can be signaled to the operator or the driver of a motor vehicle immediately and directly in a tactile manner that the shift command he wishes to implement is currently unavailable or cannot be momentarily implemented by the system.

Blocking of the push button and optionally of all push buttons of the actuating device may likewise take place thanks to the controllable blocking means, for example, in case of a total failure of the entire system, or in case of failure of the signal transmission from the actuating device to the controlled system. It is thus unmistakably signaled to the operator or driver that it is currently impossible to control the system or to actuate the automatic transmission. The hazardous situations described in the introduction can thus be avoided with a high level of certainty.

The present invention is embodied independently from the design of the blocking means and its arrangement in the area of the push button arrangement, as long as reliable blocking of the corresponding push button is ensured with the blocking means.

According to a preferred embodiment of the present invention, the blocking means is designed, however, such that the particular push button is blocked if auxiliary energy is not present for operating the blocking means. In other words, this means that the unblocking of the particular push button takes place by applying the auxiliary energy, whereas the push button is automatically blocked in case of any failure of the auxiliary energy to ensure a "fail-safe system."

The type and origin of the auxiliary energy are not essential according to the present invention. According to a preferred embodiment of the present invention, the blocking means is actuated, however, electrically, preferably by means of an electromagnet. The actively controlled blocking of the push button can thus be designed as a simple, inexpensive blocking of a robust design.

The present invention can be embodied independently from the position in which the push button can be blocked by means of the blocking means. According to an embodiment of the present invention, the push button can be blocked by the blocking means in the elevated, i.e., non-pressed position of the push button. An immediate tactile feedback can thus be obtained for the operator due to the resistance of the blocking means becoming perceptible in case of the attempt to press a blocked push button.

However, provisions are made according to another, alternative embodiment of the present invention for the push button to be able to be brought actively into the elevated push button position from the pressed position of the push button, in which case the push button is preferably spring-loaded in the direction of the pressed push button position.

In other words, this means that the auxiliary energy of the blocking means is used to move the push button from the pressed position into the elevated, non-pressed position and to hold it there with a certain force. The push button can then be pressed by the operator from this position while overcoming the force generated by the blocking means. However, if the blocking of a push button is activated, the auxiliary energy of the blocking means of this push button is switched off, and the push button falls back, because of the spring load, into the pressed position, in which no actuation of the system by the push button can take place in this embodiment.

This embodiment has a number of special advantages. For example, a direct optical feedback additionally takes place in this embodiment, besides the tactile feedback, which is likewise embodied here, because the operator can recognize in this embodiment of the actuating device already by looking at the pressed state of the push button that the push button in question is blocked and the corresponding function is momentarily not available or cannot be selected, without the push button having to be touched for this. Furthermore, a possible failure of the actuating device or failure of the auxiliary energy also causes the push button to fall back immediately into the pressed position. The system failure is immediately recognizable in this case as well, especially because the actuating device is an actuating device with a plurality of push buttons.

According to another embodiment of the present invention, the means present in the actuating device for generating the electrical control signals comprise a switching means, a separate switching means with a signal transmitter being preferably associated with each push button to ensure the reliability of the actuating device.

According to another preferred embodiment of the present invention, the switching means associated with a push button comprises more than one signal transmitter, preferably two or four signal transmitters, which are preferably arranged in parallel.

The use of two signal transmitters per push button has the advantage that even the failures of a switching means designated as so-called simple errors can be recognized with it for increased failure safety or redundancy, because different states of the two signal transmitters, which states are not admissible or do not occur in satisfactory operation, are thus recognized in case of the failure of one of the two signal transmitters of one push button. However, which of the two signal transmitters has failed or which of the two signal transmitters is now reporting the correct state corresponding to the position of the push button cannot yet be recognized with two signal transmitters per push button. Even though the malfunctioning push button can thus be identified with two signal transmitters per push button, the actual switching state of that push button cannot be recognized.

If four signal transmitters are used per push button, both simple errors can be recognized and the instantaneous position of the push button can still also be identified at the same time, because three signal transmitters still assume a value that is identical for these three even in case of failure of one signal transmitter and furnish a reliable indication of the actual state of the push button despite the failure of one signal transmitter. Even though the so-called twofold errors, which are, however, much more unlikely, can also be recognized with four signal transmitters, the actual switching state of the push button is no longer identifiable in this extremely rare case, analogously to the simple error in case of two signal transmitters being present per push button.

The principle of operation according to which the at least one signal transmitter operates concretely is not relevant now at first as long as a sufficient number of switching cycles as well as sufficient robustness and vibration resistance are given. However, the signal transmitter is designed as a microswitch according to a preferred embodiment of the present invention.

The use of microswitches is advantageous insofar as these are in the form of inexpensive and robust standard components and, moreover, withstand an extremely high number of switching cycles without maintenance.

According to other preferred embodiments of the present invention, the especially inexpensive and robust switching mats known from the area of input keyboards or, depending on the profile of requirements imposed, even magnetically operating Hall sensors or optical sensors are used as signal transmitters.

According to another embodiment of the present invention, the actuating device comprises, furthermore, a device for the mechanical unlocking of the blocking means. This unlocking device is available as a so-called override function for the case of malfunctions of the drive of the blocking means. Thus, the unlocking device makes it possible, in the form of a manual mechanical unblocking of the blocking means, for example, in case of failure of the blocking means, that the actuating element can nevertheless be actuated in the sense of an emergency operation.

The present invention will be explained in more detail below on the basis of drawings showing embodiments. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
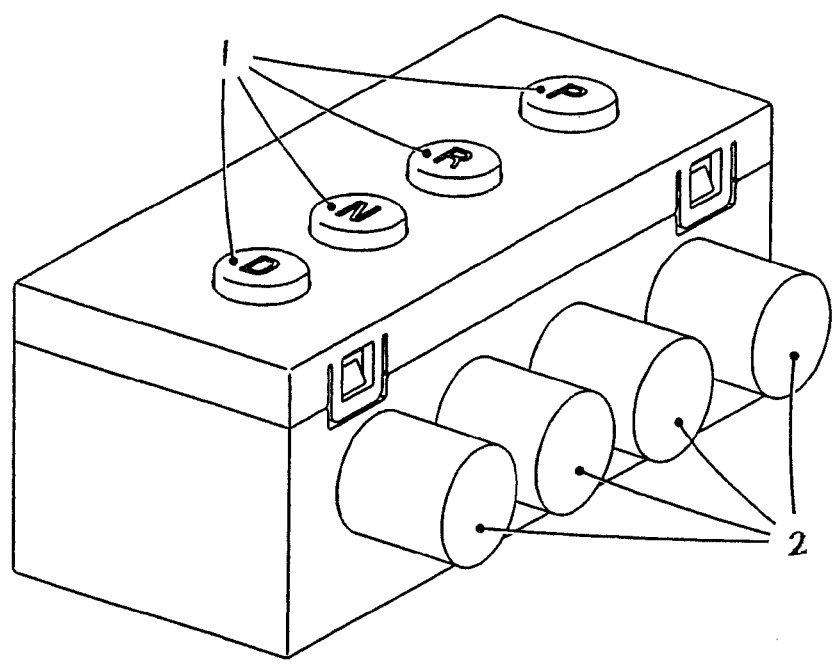
FIG. 1 is a schematic isometric view of an embodiment of an actuating device for a vehicle transmission.

Referring to the drawings in particular, FIG. 1 shows an isometric view of an embodiment of an actuating device according to the present invention. This embodiment is an actuating device for an automatic transmission of a vehicle.

Four push buttons 1, which are associated with the four selectable gears "P," "R," "N" and "D" of an automatic transmission, can first be recognized in the view in FIG. 1. One of the gears is selected here by pressing the corresponding push button 1.

In addition, the actuating device according to FIG. 1 also has, however, four electromagnets 2, an electromagnet 2 being associated with each of the push buttons "P," "R," "N" and "D." The electromagnets 2 are used to actuate the blocking means of the individual push buttons "P," "R," "N" and "D."

Figure 2:
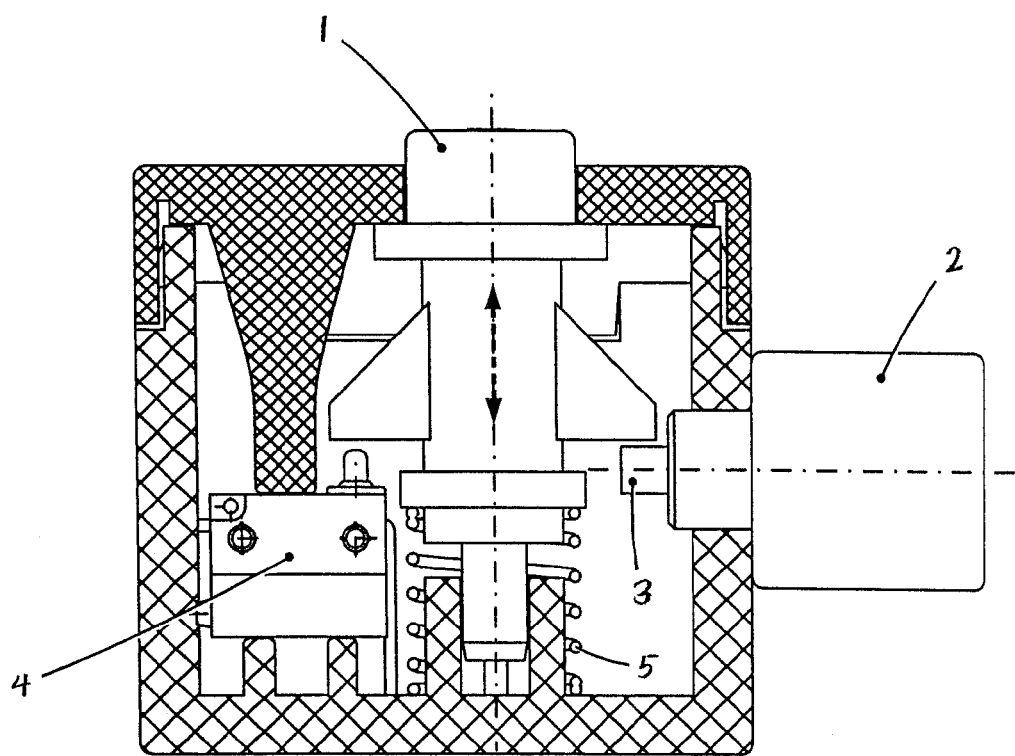
FIG. 2 is a schematic sectional view of the actuating device according to FIG. 1 as a cross section along one of the push buttons.

The design and the mode of action of the blocking means appear from the sectional view according to FIG. 2. One of the push buttons 1 as well as the electromagnet 2 associated with that push button 1 are again recognized at first. The push button 1 is shown in FIG. 2 in the non-pressed, elevated position, in which it is held by the coil spring 5 in the otherwise neutral state. The electromagnet 2 has a mobile armature, not shown, which is connected to a locking pin 3. The magnetic coil and the armature of the electromagnet 2 are arranged here such that the armature and the locking pin 3 are moved to the right relative to the drawing when current is flowing through the coil (not shown) of the electromagnet 2, whereas the armature and the locking pin 3 are always in their left end positions relative to the drawing because of a spring (likewise not shown) in the currentless state of the electromagnet 2.

In other words, this means that the push button 1 is blocked in the currentless state of the electromagnet 2 because of the extended locking pin 3 and cannot therefore be pressed by the driver. At the same time, this causes that the microswitch 4 cannot be actuated, either, and no electrical switching signal can thus be generated and transmitted to the vehicle transmission, either.

However, as soon as the control circuit of the actuating device or the transmission control releases the push button 1 and the gear that can be selected therewith, electrical voltage is sent to the electromagnet 2, as a result of which the armature and the locking pin 3 move to the right relative to the drawing and thus release the path for the push button 1 downwards.

The driver can now press the corresponding push button 1, as a result of which the microswitch 4 is actuated and a corresponding electrical signal is generated and transmitted to the vehicle transmission or to the transmission control.

FIGS. 3 and 4 show once again the entire mechanism of the actuating device according to FIGS. 1 and 2 in an isometric view and from different directions of view, the housing being faded out in the views in FIG. 3 and FIG. 4.

Figure 3:
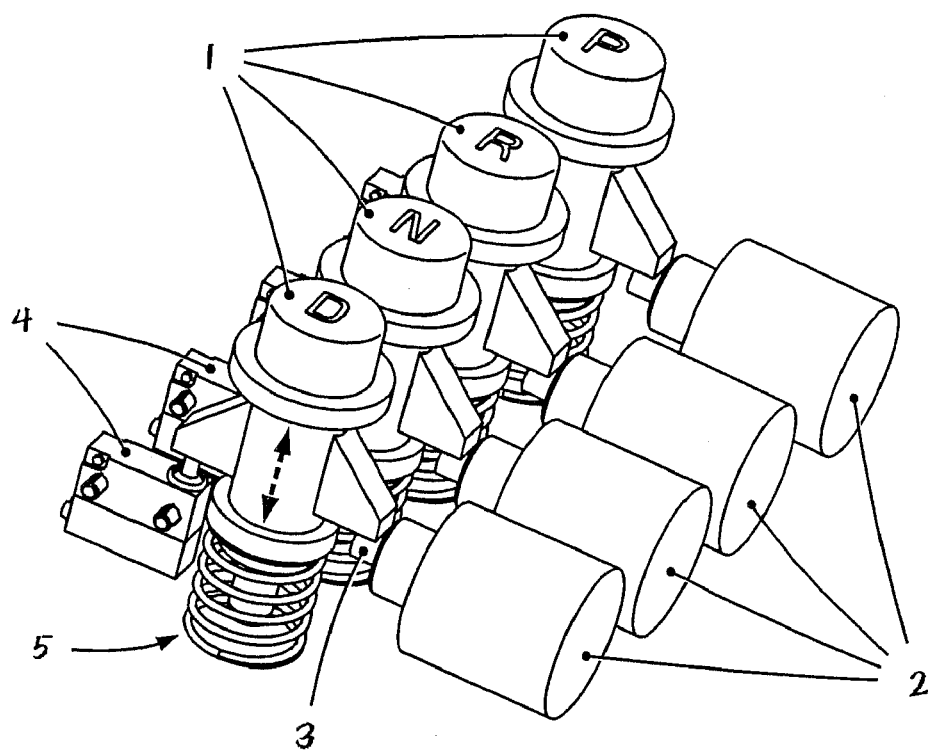
FIG. 3 is a view corresponding to FIG. 1 of the actuating device according to FIGS. 1 and 2 with the housing not shown and with the direction of view towards the blocking means.
Figure 4:
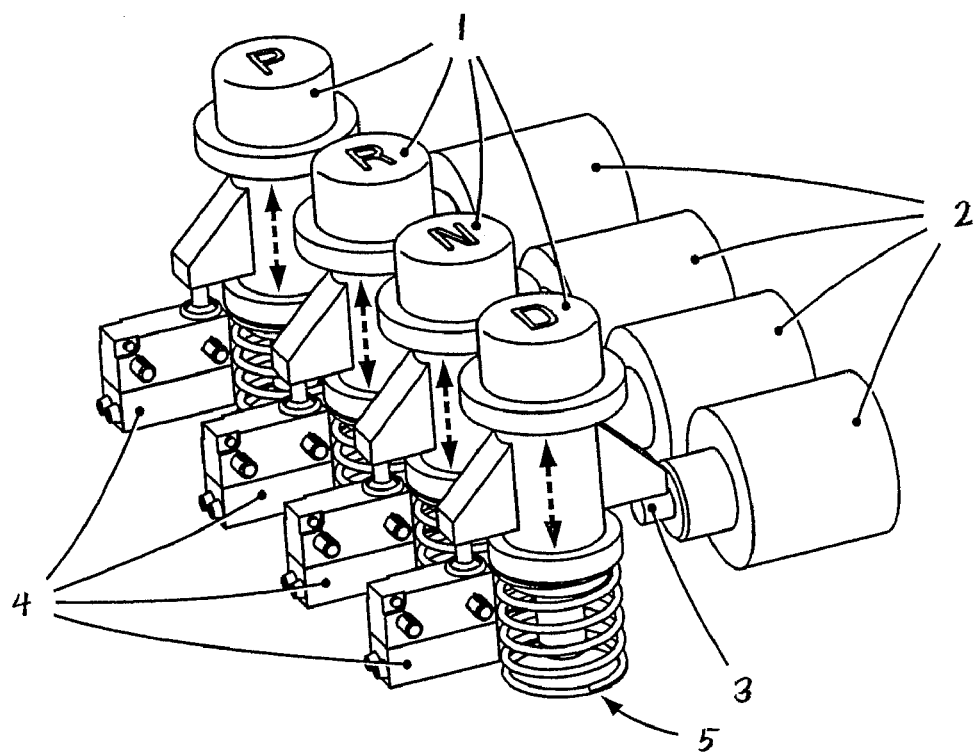
FIG. 4 is a view corresponding to FIG. 3 and a view of the actuating device according to FIGS. 1 through 3 with the direction of view towards the electrical signal transmitters.

It is clearly recognized that an electromagnet 2 with a locking pin 3, as well as a microswitch 4 and a resetting spring 5 each are associated with each push button 1. FIGS. 3 and 4 show, in particular, the simple and extremely robust design of the actuating device according to the present invention, which comprises, on the whole, only a small number of basic elements having a simple design. This is advantageously favorable for inexpensive production, a correspondingly high operational reliability and long service life of the actuating device.

The table below shows, furthermore, an example of a switching logic, which can be associated with the exemplary embodiment of the actuating device according to FIGS. 1 through 4.

The gray-shaded fields in the left-hand column (column 1) show the instantaneously engaged gear "P," "R," "N" and "D," whereas the presence of other general conditions ("brake pressed" or "vehicle speed above a set speed limit") is entered in columns 2 and 3.

The state of the blocking means of the individual push buttons which is associated with a combination of general conditions according to columns 1 through 3 can be found in columns 4 through 7. For example, all four push buttons "P," "R," "N" and "D" can be freely actuated when the neutral position "N" is engaged and the brake is pressed at the same time (line 6), because it is admissible to engage any gear when these general conditions are present. However, if the brake is not pressed when the neutral position "N" is engaged, it is not possible to shift out of the neutral position "N" and to engage one of the gears "P," "R" or "D" for reasons of safety (line 5).

By contrast, all push buttons are blocked when an error occurs in the area of the transmission or the transmission control in order to also signal the state of disturbance to the driver in a tactile form (line 9).

| | 1 Gear | 2 Brake pressed | 3 $v > v_{limit}$ | 4 P button | 5 R button | 6 N button | 7 D button |
|---|---|---|---|---|---|---|---|
| 1 | P | no | | released | blocked | blocked | blocked |
| 2 | P | yes | | released | released | released | released |
| 3 | R | | no | released | released | released | released |
| 4 | R | | yes | blocked | released | released | blocked |
| 5 | N | no | | blocked | blocked | released | blocked |
| 6 | N | yes | | released | released | released | released |
| 7 | D | | no | released | released | released | released |
| 8 | D | | yes | blocked | blocked | released | released |
| 9 | Case of error | | | blocked | blocked | blocked | blocked |

Thus, it becomes clear as a result that thanks to the present invention, an actuating device, which makes possible the especially reliable and low-error actuation of the technical system or vehicle transmission, is obtained for electrically or electronically controlled technical systems, especially for speed-change gears of motor vehicles. The selection especially of inadmissible shifting sequences or operating states is thus prevented in the motor vehicle for operational reliability and driving safety, and the fact that a corresponding shift command is not admissible or is impossible is signaled to the operator or driver in a clear tactile or optical form.

Thus, the present invention makes an essential contribution to the improvement of the safety, ergonomics and operatability of technical systems, especially when the present invention is used in the area of vehicle transmissions.

While specific embodiments of the invention have been shown and described in detail to illustrate the application of the principles of the invention, it will be understood that the invention may be embodied otherwise without departing from such principles.

The invention claimed is:

1. An actuating device for a shift-by-wire speed-change gear technical system, the actuating device comprising:
    a push button arrangement with at least one push button;
    a signal means for generating electrical control signals for transmission to the technical system,
    a separately controllable blocking means for mechanically blocking said push button, said blocking means having a driving energy connection for being driven by means of auxiliary energy.

2. An actuating device in accordance with claim 1, wherein said blocking means is in the blocked state when auxiliary energy is not present.

3. An actuating device in accordance with claim 1, wherein said blocking means is electrically actuateable.

4. An actuating device in accordance with claim 1, wherein said blocking means is electromagnetically actuateable.

5. An actuating device in accordance with claim 1, wherein said push button is blockable by means of said blocking means in the elevated position of the push button.

6. An actuating device in accordance with claim 1, wherein said push button is movable into the elevated push button position from the pressed push button position by means of said blocking means.

7. An actuating device in accordance with claim 6, wherein said push button is spring-loaded in the direction of the elevated push button position.

8. An actuating device in accordance with claim 1, wherein the means for generating electrical control signals comprise a switching means.

9. An actuating device in accordance with claim 8, wherein a switching means with at least one said signal transmitter is associated with each said push button.

10. An actuating device in accordance with claim 8, wherein the switching means associated with a push button comprises two said signal transmitters.

11. An actuating device in accordance with claim 8, wherein said switching means associated with a push button comprises four said signal transmitters.

12. An actuating device in accordance with claim 1, wherein said signal transmitter is designed as a microswitch.

13. An actuating device in accordance with claim 1, wherein said signal transmitter is designed as a switching mat.

14. An actuating device in accordance with claim 1, wherein said signal transmitter is designed as a Hall sensor.

15. An actuating device in accordance with claim 1, wherein said signal transmitter is designed as an optical sensor.

16. An actuating device in accordance with claim 1, wherein said actuating device comprises a mechanical unlocking device for overcoming said blocking means.

17. An for selecting gears of a shift-by-wire automatic transmission speed-change gear technical system, the actuating device comprising:
    a push button arrangement with a push button;
    a signal means disposed for actuation by said push button for generating electrical control signals for transmission to the technical system;
    a separately controllable blocking means for mechanically blocking said push button, said blocking means having a driving energy connection for being driven by means of at least one of a main vehicle energy source and auxiliary energy.

18. An actuating device in accordance with claim 17, wherein said blocking means assumes a blocked state when auxiliary energy is not present.

19. An actuating device in accordance with claim 17 wherein said push button is blocked by said blocking means in an elevated position of said push button.

20. An actuating device in accordance with claim 17, wherein said push button is brought into the elevated push button position from a pressed push button position by said blocking means.

* * * * *